Figure 1:
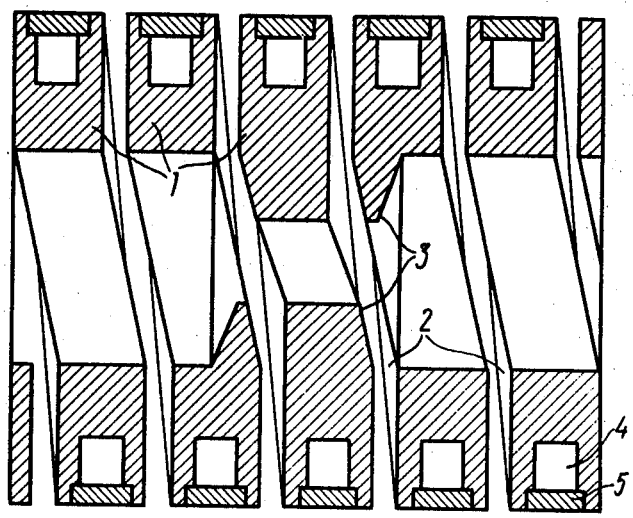

United States Patent

[11] 3,603,760

[72] Inventors Konstantin Konstantinovich Khrenov
 ulitsa Cheljuskintsev, 15, kv. 11, Kiev;
 Vyacheslav Andreevich Chudakov, ulitsa
 Bolnichnaya, 14, kv. 2., Kiev; Konstantin
 Vasilievich Stroganov, ulitsa
 Avtozavodskaya, 6, korpus A, kv. 202,
 Moscow; Vladimir Leonidovich Kleiman,
 Chelyabinskoi Oblasti, ulitsa
 Chernyshevskogo, 11, kv. 29, Miass;
 Mikhail Mironovich Fishkis, Zvezdny
 Bulvar, 5, kv. 28, Moscow; Vyacheslav
 Mikhailovich Nikolaev, Chelyabinskoi
 Oblasti, ulitsa Molodezhnaya, 14, kv. 71,
 Miass; Vladimir Kommunarovich
 Kalnishevsky, Chelyabinskoi Oblasti,
 ulitsa Molodezhnaya, 8, kv. 50, Miass;
 Boris Mikhailovich Maltsev, Chelyabinskoi
 Oblasti, ulitsa Dobroljubova, 4, kv. 6, Miass,
 all of, U.S.S.R.
[21] Appl. No. 804,505
[22] Filed Mar. 5, 1969
[45] Patented Sept. 7, 1971
[32] Priority Mar. 5, 1968
[33] U.S.S.R.
[31] 1220255

[54] APPARATUS FOR EFFECTING THE MAGNETIC-IMPULSE WELDING AND PRESSURE WORKING OF METALS, PREFERABLY FOR WELDING TUBULAR-SHAPED PARTS
5 Claims, 3 Drawing Figs.

[52] U.S. Cl. .................................................... 219/10.79,
 219/8.5
[51] Int. Cl. ...................................................... H05b 9/02,
 H05b 5/00
[50] Field of Search ........................................... 219/8.5,
 10.79, 10.75, 10.59; 336/223

[56] References Cited
UNITED STATES PATENTS

| | | | |
|---|---|---|---|
| 2,676,233 | 4/1954 | Foxx............................. | 219/8.5 X |
| 2,792,482 | 5/1957 | Logan et al.................. | 219/10.79 X |
| 2,182,820 | 12/1939 | Pisarev......................... | 219/10.79 |
| 3,319,037 | 5/1967 | Stein et al. ................... | 219/10.75 |

Primary Examiner—J. V. Truhe
Assistant Examiner—L. H. Bender
Attorney—Waters, Roditi, Schwartz & Nissen ABSTRACT: An apparatus for magnetically welding metals comprises an inductor. The inductor includes means defining a plurality of turns axially and annularly spaced from one another. The inductor includes an intermediary portion of the increased thickness defining a welding zone. The intermediary portion is annular and acts to increase the concentration of a magnetic field applied in the welding zone. The turns have respective diameters varying successively toward the welding zone.

APPARATUS FOR EFFECTING THE MAGNETIC-IMPULSE WELDING AND PRESSURE WORKING OF METALS, PREFERABLY FOR WELDING TUBULAR-SHAPED PARTS

The present invention relates to apparatus for effecting the magnetic-impulse welding and pressure working of metals, preferably for welding tubular-shaped parts.

The present invention may be used to advantage in pressing tubular-shaped parts, for example tie rods employed in the car-building industry, for piercing holes in the tubular-shaped articles, and in manufacturing operations involving reduction of the said parts.

Known in the prior art is an apparatus for effecting the magnetic-impulse welding and pressure working of metals, preferably for welding tubular-shaped parts, the apparatus comprising a multiple-turn inductor.

The apparatus is essentially a multiple-turn inductor, constituted as a solenoid accommodating a magnetic-field concentrator ensuring an annular weld penetration to be obtained along the entire perimeter of the pipes being welded.

Using inductors made as a solenoid permits a welded joint to be obtained, repeating the contour of the inductor turns, that is, the welding is effected along a spiral, which not always ensures a dependable and tight joint to be obtained between the pipes to be welded.

The use of the magnetic-field concentrators placed inside a multiple-turn, cylindrical inductor, is conducive to additional losses of power, resulting from the presence of a gap between the inductor and concentrator, and also considerably complicates the construction of the working unit of the apparatus, i.e. the inductor.

All theses disadvantages are likely to result in that the above-said apparatus and, hence, the magnetic-impulse installation provided with such devices, feature a low efficiency. The rated efficiency coefficient of such apparatus does not exceed 50 percent, being practically equal to as low as 10 to 20 percent. That is why a reduction in the amount of energy being uselessly spent for creating the so-called "parasitic" magnetic fields both in the concentrator and inductor is an important problem.

It is an object of the present invention to eliminate the above-said disadvantages.

The principal object of the invention is to provide such an apparatus for effecting the magnetic-impulse welding and pressure working of metals, preferably for welding tubular shaped parts, which would allow a reduction in the amount of power spent uselessly, and hence an increase in efficiency of the installation using this apparatus.

In accordance with the invention, this object is achieved owing to the fact that in the apparatus for effecting the magnetic-impulse welding and pressure working of metals, preferably for welding tubular-shaped parts, comprises a multiple-turn inductor, the internal and/or external diameter of the inductor turns varying along its length, the inductor possessing a surface contour facing the parts to be welded, that would ensure the concentration of the magnetic field within the welding zone.

The proposed apparatus should be made such that the internal diameter of the inductor turns decrease in the direction towards the welding zone.

It is also advisable to make the proposed apparatus in such a manner that the external diameter of the inductor turns increase in the direction towards the welding zone.

Figure 2:
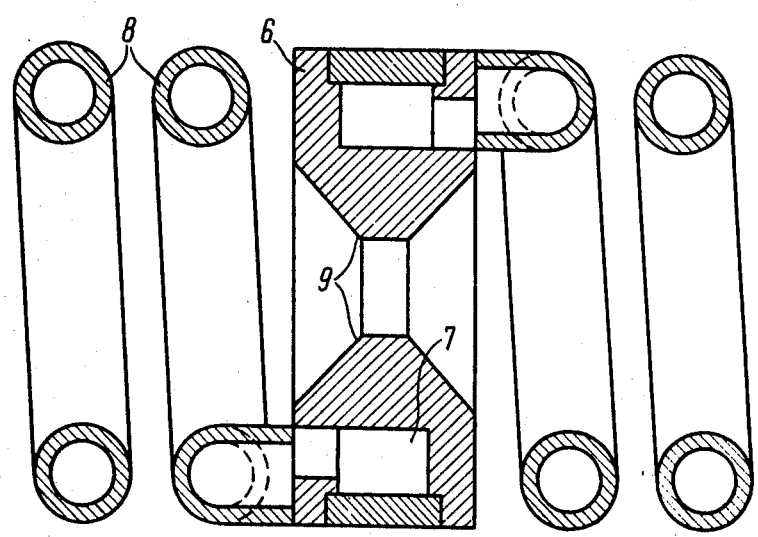
Figure 3:
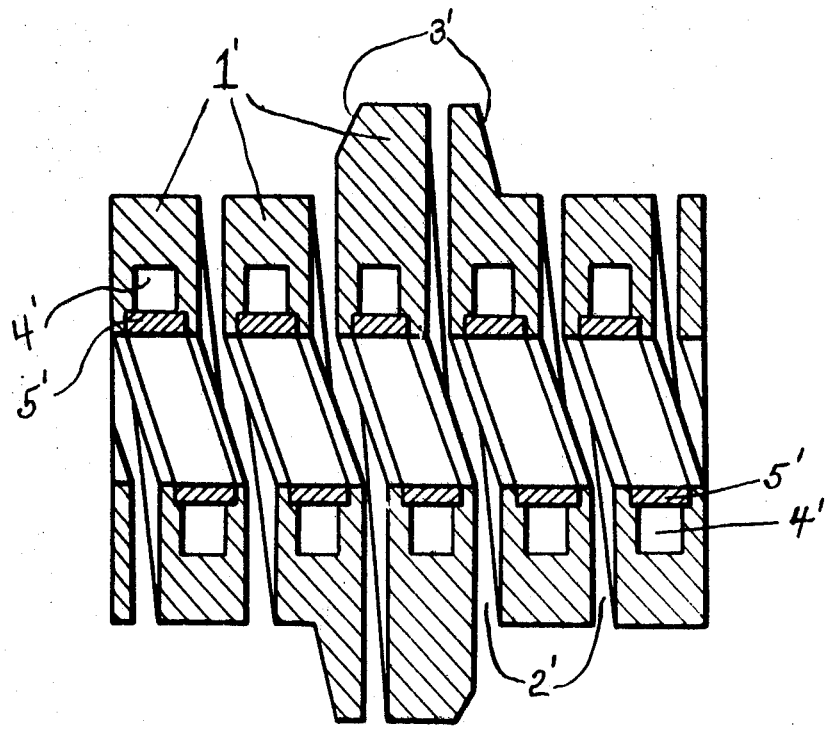

In order that the invention may be clearly understood, one embodiment thereof will now be described by way of example only, reference being made to the drawings accompanying the specification, in which:

FIG. 1 is a longitudinal section through one embodiment of an apparatus for effecting the magnetic-impulse welding of pipes, as embodied according to the invention, FIG. 2 is a longitudinal section of another embodiment of the invention, and FIG. 3 is a longitudinal section of another embodiment of the invention.

The apparatus for effecting the magnetic-impulse welding of pipes is essentially a multiple-turn inductor accommodating an internal zone for the concentration of a magnetic field the zone being disposed perpendicular to the inductor axis. This zone may be disposed in any portion of the inductor along its length.

The largest concentration of the magnetic field is created when the concentration zone is disposed in the central portion of the inductor. In this case, the central of the turns (FIG. 1) of the inductor is made as a concentrator provided with an inclined slit coinciding with the inter-turn gap 2.

The arrangement of the concentration zone perpendicular to the inductor axis allows a dependable tight welded joint to be produced between the pipes being welded.

To obtain an annular weld penetration along the entire perimeter of the pipes being welded, the inductor is made with a variable internal and/or external diameter of the turns 1 varying along the length of the inductor. The inductor is provided with such a surface contour 3 facing the pipes being welded, which would ensure the concentration of the magnetic field within the welding zone. The inclined surfaces 3 cooperatively define a substantially conically annular portion extending inwardly of the turns 1.

The proposed apparatus may be employed for effecting the magnetic-impulse welding of pipes of different diameters.

In order to weld small-diameter pipes, when the pipes are placed inside the proposed apparatus, the internal diameter of the inductor turns is to be decreased in the direction towards the welding zone.

For welding large-diameter pipes, when the proposed apparatus is placed inside the pipes to be welded, the external diameter of the inductor is to be increased in the direction towards the welding zone.

The proposed apparatus uses a considerably simplified cooling system, as the concentrator is a component part of the inductor. Any kind of a coolant may be employed, but the water cooling is found to be the most effectual.

To provide a cooling channel in the apparatus, groove 4 is provided in the inductor turns 1, the grove 4 being welded together with a metal band 5.

FIG. 2 represents another embodiment of the proposed apparatus, differing from the preceding one in the method of its manufacture.

Manufactured first is concentrator 6 of a magnetic field, provided with a groove 7 for its cooling. Attached then to the concentrator 6 of magnetic field on both sides are (by welding, soldering, etc.) turns 8 of the inductor, or an inductor is originally wound from a pipe and attached thereto is the readymade concentrator.

The manufacturing of the proposed apparatus of such a type is a somewhat simpler procedure, being more easily effected than that of the preceding one; and moreover, there is the possibility of replacing only the concentrator, whose surface 9 facing the pipes to be welded, conically annular is subjected to wear in service, resulting from high dynamic loads applied thereto.

FIG. 3 shows another embodiment, similar to FIG. 1, but in which the external diameter of the turns increases in the direction towards the welding zone. Similar parts have been given the same reference numerals but with primes.

On the strength of what has been stated above, the proposed apparatus, being essentially a multiple-turn inductor uniting the properties of both the inductor and the magnetic-field concentrator, allows a reduction in the amount of power being uselessly spent, since both the inductor and concentrator are made as an integral unit, which also simplifies the construction of such an apparatus.

Moreover, the inductor cooling system allows a considerable increase in its service life owing to a slower wear of the inter-turn insulation. The cooling system also permits the incorporating of the proposed apparatus in an automatic production line. Though Though the present invention is described in connection with its preferred embodiment, it is obvious that there may be allowed modifications and variants thereof, which do not depart from the idea and scope of the invention, which will be readily understood by those skilled in the art.

These modifications and variants are understood not to depart from the idea and scope of the invention, as defined by the accompanying claims.

In the claims:

1. An apparatus for magnetically welding metals, said apparatus comprising an inductor, said inductor including means defining a plurality of turns axially and annularly spaced from one another, said inductor including a turn constituting an intermediary portion of increased thickness defining a welding zone, said intermediary portion being annular and acting to increase the concentration of a magnetic field applied in said welding zone, said intermediary portion and a turn adjacent the latter having respective diameters differing from one another.

2. An apparatus according to claim 1, in which the internal diameter of turns decreases in the direction towards the welding zone.

3. An apparatus according to claim 1 in which the external diameter of turns increases in the direction towards the welding zone.

4. An apparatus as claimed in claim 1 wherein said intermediary portion is annular and conically tapers inwardly of said inductor turns.

5. An apparatus as claimed in claim 1 wherein said turns are each provided with a channel for containing a coolant.